United States Patent [19]

Cleveland et al.

[11] 4,047,695

[45] Sept. 13, 1973

[54] ADJUSTABLE CHOKE

[75] Inventors: John T. Cleveland; Walter L. Chappell; John D. Watts, all of Houston, Tex.

[73] Assignee: Chappell Industries, Inc., Houston, Tex.

[21] Appl. No.: 563,190

[22] Filed: Mar. 28, 1975

[51] Int. Cl.² .............................................. F16K 47/04
[52] U.S. Cl. .................................... 251/122; 138/46; 138/45
[58] Field of Search ...................... 251/122; 138/46, 45

[56] References Cited

U.S. PATENT DOCUMENTS

| 1,449,873 | 3/1923 | Steuber | 251/122 X |
|---|---|---|---|
| 2,014,314 | 9/1935 | Defenbaugh | 251/122 |
| 3,194,533 | 7/1965 | McLay | 251/122 |
| 3,521,853 | 7/1970 | Gillis et al. | 251/122 |
| 3,757,816 | 9/1973 | Price | 251/368 X |

FOREIGN PATENT DOCUMENTS

| 701,396 | 1/1941 | Germany | 251/122 |
|---|---|---|---|
| 1,425,730 | 12/1968 | Germany | 251/122 |

Primary Examiner—Arnold Rosenthal
Attorney, Agent, or Firm—Guy E. Matthews

[57] ABSTRACT

A low pressure drop adjustable choke has a variably adjustable tapered annular port for metering flow of a fluid. The annular port is defined by a tapered plug extending through a mating, correspondingly tapered seat. The area of the port is selectively varied by axial movement of the plug relative to the seat. The device is mechanically adjustable to a selected flow rate, which may be indicated on a precision indicator.

1 Claim, 2 Drawing Figures

ADJUSTABLE CHOKE

BACKGROUND OF THE INVENTION

This invention relates to flow regulating devices for oil and gas wells, and, more particularly, to adjustable chokes for metering of well fluid.

Adjustable chokes are commonly used in oil and gas wells to control the flow of a well fluid. Adjustable chokes not only provide flow and non-flow control, but they also enable the flow of a well fluid to be set to a specified rate.

The most commonly used adjustable chokes are those which utilize a needle valve to increase or decrease the area available for flow proximate an outlet port of the choke. Chokes of this type have a stem which tapers to a point at its end to form a needle. The stem is moved relative to a seat to vary the flow area.

The performance of the adjustable chokes heretofore available has been questionable, in all but applications involving relatively low flow rates. Prior art adjustable chokes have suffered from large pressure drops through the devices, causing a loss of needed pressure further downstream. Performance has been even further diminished in well applications where quantities of sand or other abrasive materials are entrained in the well fluid. This reduction in performance has resulted from the rapid wearing away and a disfigurement of choke components, such as the valve seat, by the abrasive materials. When this occurs, the flow of well fluid becomes even more turbulent. As turbulence increases, the increased pressure drop is added to the inherent pressure drop of the needle itself. Even the common flow bean may be severely abraded in such applications, increasing the turbulence present within it and causing an increased pressure drop.

It is apparent that an efficient, rugged, adjustable choke is highly desirable to permit longer intervals between inspections or replacements and to maintain a higher fluid pressure downstream from the device.

Abrasion problems also have been encountered in the past in downhole safety devices which are used to shut-in wells to terminate the flow of well fluid when a predetermined flow rate is exceeded. It has been found that a tapered plug and seat arrangement can be used to reduce deterioration of downhole safety valve components, resulting in greatly increased reliability. Such a device is shown in U.S. Pat. No. 3,757,816.

It will be observed that downhole safety valves and adjustable chokes are totally dissimilar devices. Neither the basic designs nor the objectives of the devices are the same. Safety valves are adapted for shutting in a well in response to a predetermined maximum flow condition, whereas adjustable chokes are adapted for metering the production flow of a well fluid. Further, the locations of utilization are different, downhole safety valves being used below the surface within the well bore, and adjustable chokes being used above ground.

SUMMARY OF THE INVENTION

There is accordingly provided by this invention a novel adjustable choke for metering the flow of a well fluid, which choke provides a larger flow of well fluid for a given differential pressure than is provided by prior art choke designs.

There is provided an adjustable choke which operates with less noise and vibration than prior art devices.

There is further provided by the instant invention an adjustable choke configuration which directs flow to provide improved resistance to abrasives entrapped in a well fluid.

There also is provided in accordance with this invention an adjustable choke having a longer useful service life than those heretofore available.

There is yet further provided an adjustable choke which tends to reduce the abrasive wear on other wellhead elements downstream of the choke.

Adjustable chokes in accordance with the present invention are fully adjustable, providing selective setting of the flow rates for a flow of well fluid. The adjustable choke has a body having an inlet port to permit passage of a well fluid into the body and a discharge section through which a well fluid can depart the body. Within the body and downstream of the inlet port are an annular, internally tapered seat and a matching tapered plug adapted to move axially relative to the seat to define a tapered annular port or orifice for well fluid flow. The tapered plug is moved to variably adjust the area of the tapered annular orifice formed between the seat and the plug. A flow of well fluid passing through the tapered annular orifice tends to become centralized and directed to pass smoothly through the seat and through downstream elements of the fluid system.

Other features and advantages of the present invention will become apparent from the description that follows, when considered in conjunction with the drawings.

DESCRIPTION OF THE PREFERRED EMBODIMENT

Figure 1:
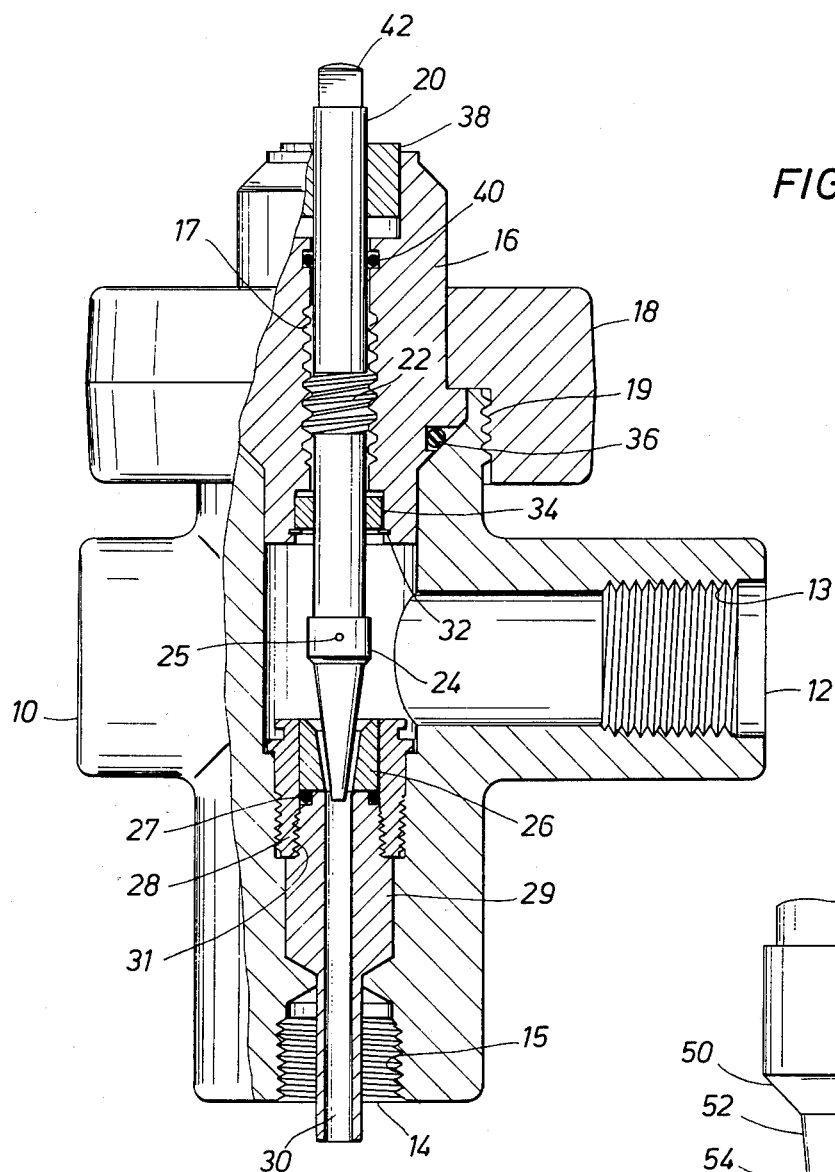
FIG. 1 is a side cutaway view of one embodiment of an adjustable choke in accordance with the present invention, showing a T-shaped body configuration.

Referring to FIG. 1, there is illustrated one embodiment of an adjustable choke in accordance with the present invention. The choke has a choke body 10 having an inlet port 12 which permits passage of a well fluid into the body and a discharge section 14 through which well fluid can depart. In this embodiment, choke body 10 is shown to have a threaded connection 13 at the inlet port 12 and a threaded connection 15 at the discharge section 14, although other sorts of connections may, of course, be utilized. Interior to the choke body 10 and downstream from the inlet port 12 are an annular tapered seat 26 and a correspondingly tapered plug 24. The plug 24 extends through the seat 26 to define a tapered, annular flow orifice through which well fluid may pass. The plug 24 is axially movable with respect to the seat throughout a full range of positions, including a closed position in which the tapered surfaces of the two members are brought into mating contact.

The seat 26 is carried by a seat adapter 28 which is in threaded engagement with choke body 10. Below seat 26, there is a flow tube 29 which has an inside diameter equal to the outlet diameter of seat 26. Flow tube 29 is held within choke body 10 by threads 31 connecting it to seat adapter 28. An O-ring 27 is placed just below seat 26 immediately above threads 31.

A packing gland 16 is inserted into the upper portion of choke body 10. Packing gland 16 carries an O-ring 36 which prevents fluid seepage through the top of the choke. Packing gland 16 is firmly held by a retainer 18 which carries threads that screw onto choke body threads 19. Packing gland 16 has a shaft opening having threads for receiving the threaded stem 22. At the lower portion of packing gland 16 proximate the threaded stem 22, there is packing 34 along with a retainer ring 32. Packing 34 is a conventional packing used to seal valves so that all well fluid will flow through the valve. At the upper portion of packing gland 16, there is a recessed annular groove containing a seal 40 which provides additional sealing above the adjustment threads 17.

Stem 22 extends through packing gland 16 and has an externally threaded portion proximate its midsection. The stem 22 extends into the flow passageway of choke body 10 and has a plug 24 attached to its end. At the upper end of the stem 22, flats 42 permit a wrench to be used to rotate stem 22. Stem 22 serves to axially move plug 24 throughout a continuous range of positions including full closure.

An indicator 38 is disposed around stem 22 and fits into a recess within packing gland 16. Indicator 38 serves to identify the position of plug 24 and gives a read-out related to the area of the annular flow orifice formed between plug 24 and seat 26. Indicator 38 includes a series of markings allowing selective setting of the flow rate through the choke.

Figure 2:
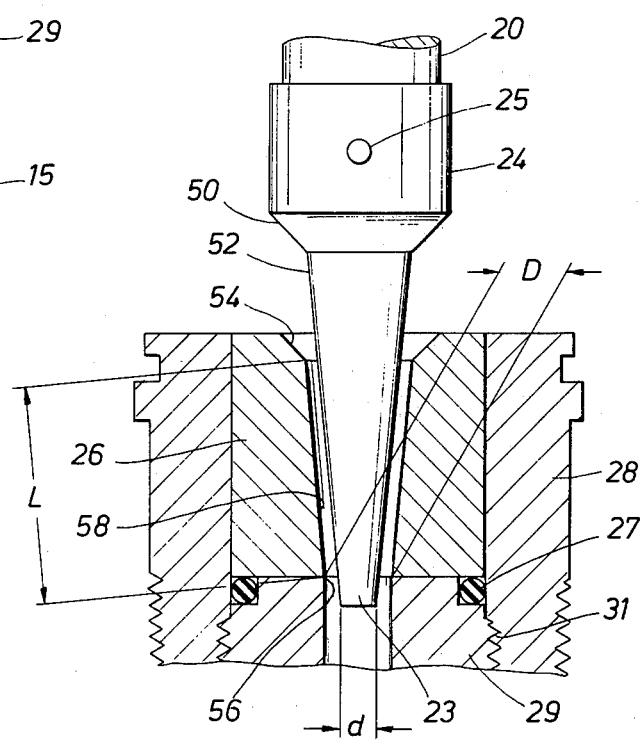
FIG. 2 is an enlarged cutaway view of the valve section of the adjustable choke of FIG. 1.

Referring now to FIG. 2, there is shown an enlarged view of plug 24 and seat 26. In this view, plug 24 is retracted slightly from seat 26 to form an annular flow orifice. Plug 24 is adjustable with respect to seat 26 to vary the area of the annular orifice to alter the flow of a well fluid through the orifice. Plug 24 is a tapering member having a compound angle taper. The angle of the first taper is at shoulder 50 and is about 45° as measured with respect to the axis of plug 24. The second angle of taper is that of the neck 52, which taper is about 8° as measured with respect to the axis of plug 24. Seat 26 is likewise of a compound angle structure. Seat 26 has a shoulder 54 which tapers at an angle of approximately 45° and mates with shoulder 50 of plug 24 such that when plug 24 is axially moved within the seat to close the orifice opening, the respective tapered surfaces of the two members are brought into mating contact. The second region of taper of seat 26 is along inner surface 58, which tapers at approximately 8°. Surface 58 contacts neck 52 upon the full movement of the plug 24 through seat 26, providing a second mating, sealing surface between the plug and the seat. Both the plug 24 and the seat 26 are preferably fabricated of an abrasion resistant material, such as, for example, tungsten carbide, and members fabricated of sintered tungsten carbide have been found especially effective in resisting abrasive wear from entrapped or suspended sand or other abrasives in the well fluid.

Plug 24 also serves to give direction to the well fluid flowing through the choke. Plug 24 is observed to have a truncated end 23 which protrudes through the downstream opening 56 of seat 26. The truncated end 23 sets up a vortex of mild turbulence immediately downstream of itself. This vortex centralizes the fluid flow and diminishes turbulence at the seat opening 56 by reducing recirculation at the edges of the flow tube 29. The mild turbulence vortex, which is very localized at the truncated end 23, is believed to be a function of three variables. The variables are the diameter of the truncated end 23, the smallest, or downstream, diameter of seat opening 56, and the length of the inner surface of seat 58 which is parallel to neck 52 of the plug 24. These three variables are assigned the notations $d$, $D$, and $L$ respectively. Two ratios form the critical design criteria for adjustable chokes according to the present invention. These ratios are as follows:

$(d/D)$, truncation ratio; and $(L/D)$, path length ratio.

To achieve acceptable results in the present invention, the truncation ratio must be between 0.2 and 0.6, i.e., the diameter of truncated end 23, (d) is from 20% to 60% of the diameter of the smallest seat opening 56 (D); and the path length ratio must be at least 0.25, i.e., the length of the tapered inner surface of seat 58 (L) must be at least 25% of the smallest seat opening 56 (D). The size of seat opening 56 will vary depending upon the flow rate desired in the particular application and the size of entrained material to be encountered.

The foregoing values represent design limitations within which the desired results are achieved. Within these limits, a truncation ratio from 0.25 to 0.50 is preferred to produce superior results. It should be noted that there is not a drastic discontinuity in beneficial results as the recommended values are departed from, but that a noticeable reduction in the beneficial results does occur as the truncation ratio increases above or decreases below the preferred values. Similarly, reduction of the path length ratio below about 0.25 tends to diminish the beneficial advantage of adjustable chokes according to the present invention, as centralization of flow then may be achieved only at lower and lower rates of fluid flow.

The results produced by a choke constructed in accordance with the present invention are most impressive. A much lower differential pressure is attained for a given flow rate than is achievable by prior art chokes. This performance is particularly advantageous when a series of production devices are downstream in the distribution, as overall pressure drop is reduced.

Adjustable chokes in accordance with this invention are particularly well suited for use with wells having a substantial amount of sand or other entrained abrasives in the well fluid. It is widely known that presently available adjustable chokes are very susceptible to permanent damage when used in abrasive environments. The prior art chokes often are rendered inoperable by the abrasive action of the well fluid on choke components such as the seat, the discharge orifice, and the stem.

Adjustable chokes of the present invention operate exceptionally well under abrasive flow conditions. It will be noted that the fluid flow path through an adjustable choke according to this invention is such that the fluid enters the choke body and moves toward the annular orifice at a relatively lower velocity than that occuring between the seat and the plug and is substantially parallel to the surface of the annular orifice where the more rapid flow occurs. The plug, in giving direction to the fluid flow, directs the abrasive materials away from the walls and toward the center of the flow path. The abrasive material entrained in the well fluid is believed to flow along the surface of the plug and through the orifice defined between the plug and the seat without mixing back in the choke body. The impingement of abrasive materials on choke components occurs to the greatest extent on the extended surface of the plug neck and the inner surface of the seat which forms the narrowest flow restriction in the annular orifice. At the truncated end of the plug, the entrained materials are drawn toward the center of the flow where a vortex of a mild turbulence is set up. Because of the centralized nature of this mild turbulence and very little recirculation of well fluid, the entrained abrasive materials do not scour the surface of the choke discharge section. Further, it has been found that chokes according to the present invention not only experience surprisingly little internal wear in abrasive flows, but that their unique design reduces abrasive wear on well equipment downstream of the chokes themselves.

The flow patterns established for abrasive materials entrained in well fluids flowing through adjustable chokes in accordance with the present invention combine with the compound angled design of the plug and seat to produce outstanding and unexpected results as compared to previously known chokes.

An additional benefit realized from the present invention is a reduction of noise and vibration normally associated with adjustable chokes. The turbulence in the directed flow of well fluid, being small in magnitude, produces little vibration in the choke body. The directed flow being able to move through the choke body efficiently and smoothly does not produce the noise levels commonly experienced with adjustable chokes.

The foregoing description of the present invention has been directed to a particular embodiment concerning the metering of flow of a well fluid for the purposes of explanation and illustration. It will be apparent, however, to those skilled in this art that the present invention may be embodied in other forms for other applications. For example, the invention could be embodied in an adjustable valve for metering a flow of fluid in a chemical process plant flowline. It will be further apparent to those skilled in this art that many modifications and changes in the apparatus may be made without departing from the scope and spirit of the invention. For example, the choke body may be of a different configuration or have flange connections rather than the T-shaped body with threaded connections as shown. Other modifications of the invention will be apparent to those skilled in this art, and for this reason the embodiments disclosed herein should be regarded as illustrative and not as limiting of the present invention. It is the applicants' intention in the following claims to cover all such equivalent modifications and variations as fall within the true spirit and scope of the invention.

What is claimed is:

1. An adjustable choke for metering a flow of fluid, comprising: a choke body having an inlet port to permit passage of fluid into said body and a discharge section through which fluid can depart said body; a valve seat having an inwardly tapering right conically shaped surface disposed within said choke body downstream of the inlet port, said seat having a discharge opening, the tapering surface of said seat having a length at least 0.25 times the diameter of said discharge opening; an axially movable plug extending through said seat and having a right conically shaped tapered outer surface parallel to said seat surface to define a tapered annular orifice in combination with said seat, said plug having a truncated downstream end with a diameter of from 0.2 to 0.6 times the diameter of the discharge opening of said seat; a flow tube below said seat providing a uniform discharge bore for a fluid discharged from said seat and having an inside diameter equal to that of said discharge opening of said seat; and means for adjustably moving said plug between a plurality of open positions and for maintaining the plug in any one of such positions after it has been moved thereto to variably adjust the area of the tapered annular orifice between said seat and said plug.

* * * * *